United States Patent [19]

Stumpf

[11] Patent Number: 4,491,491
[45] Date of Patent: Jan. 1, 1985

[54] ULTRASONIC SEPARATION APPARATUS

[75] Inventor: Walter Stumpf, Dunwoody, Ga.

[73] Assignee: Simmons U.S.A. Corporation, Atlanta, Ga.

[21] Appl. No.: 548,053

[22] Filed: Nov. 2, 1983

[51] Int. Cl.³ ......................... B29C 27/08; B32B 31/18
[52] U.S. Cl. ..................... 156/73.3; 156/251; 156/515; 156/580.2
[58] Field of Search ............... 156/73.3, 73.1, 580.1, 156/580.2, 353, 378, 64, 251, 515; 264/23

[56] References Cited
U.S. PATENT DOCUMENTS

| 3,378,429 | 4/1968 | Obeda | 156/515 |
| 3,679,526 | 7/1972 | Horton | 156/73.3 |
| 3,697,357 | 10/1972 | Obeda | 156/580.1 |
| 3,821,048 | 6/1974 | Acker et al. | 156/580.1 |
| 3,852,144 | 12/1974 | Parry | 156/73.3 |
| 4,025,374 | 5/1977 | Spindler et al. | 156/73.1 |
| 4,161,420 | 7/1979 | Clarke et al. | 156/73.3 |
| 4,227,959 | 10/1980 | Brown | 156/73.3 |
| 4,439,977 | 4/1984 | Stumpf | 156/580.1 |

Primary Examiner—Michael Wityshyn
Attorney, Agent, or Firm—A. Thomas Kammer

[57] ABSTRACT

An ultrasonic separation apparatus is disclosed which provides simultaneous cutting and sealing of thermoplastic materials. Both relatively thin and thick materials may be cut and sealed. The apparatus includes a cutting mechanism having a cutting blade mounted for oscillatory movement along its longitudinal axis. Cutting takes place at a controlled rate to allow sufficient time for simultaneous sealing to occur. The apparatus may be particularly adapted for cutting strings of pocketed coil springs to length.

10 Claims, 5 Drawing Figures

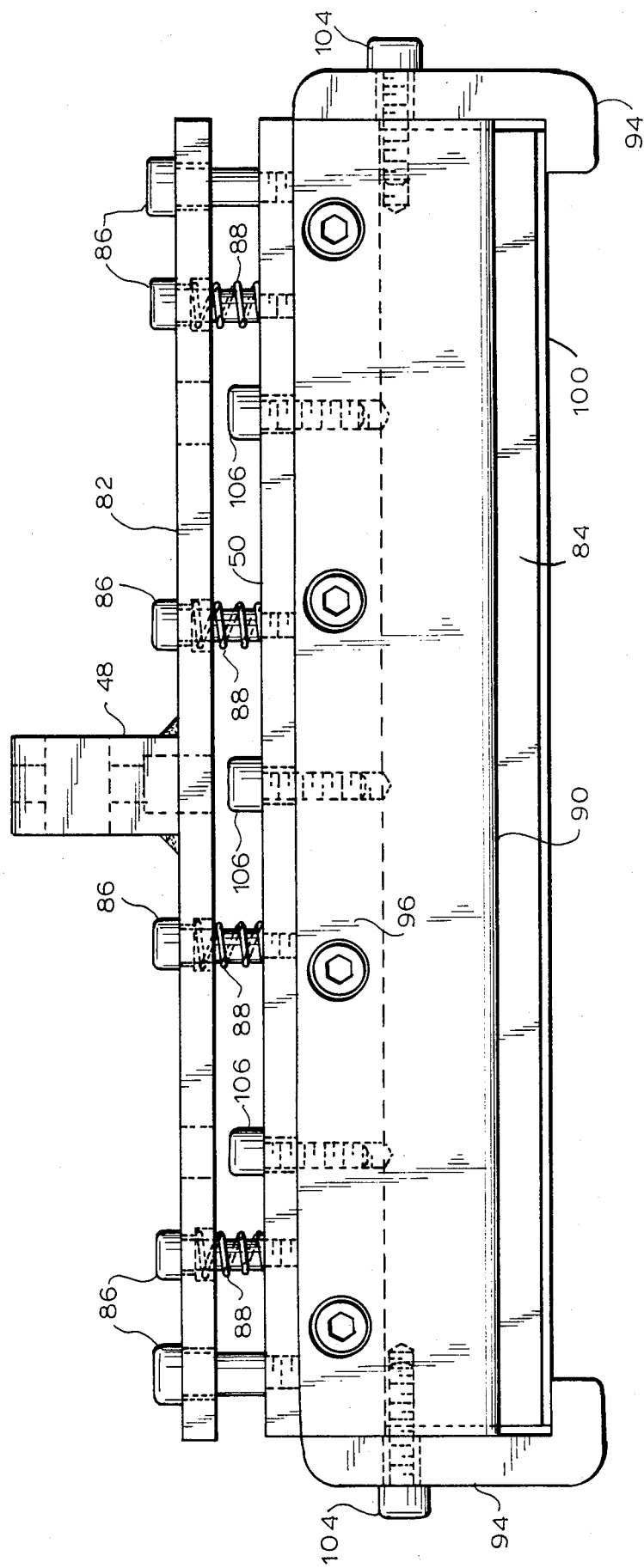

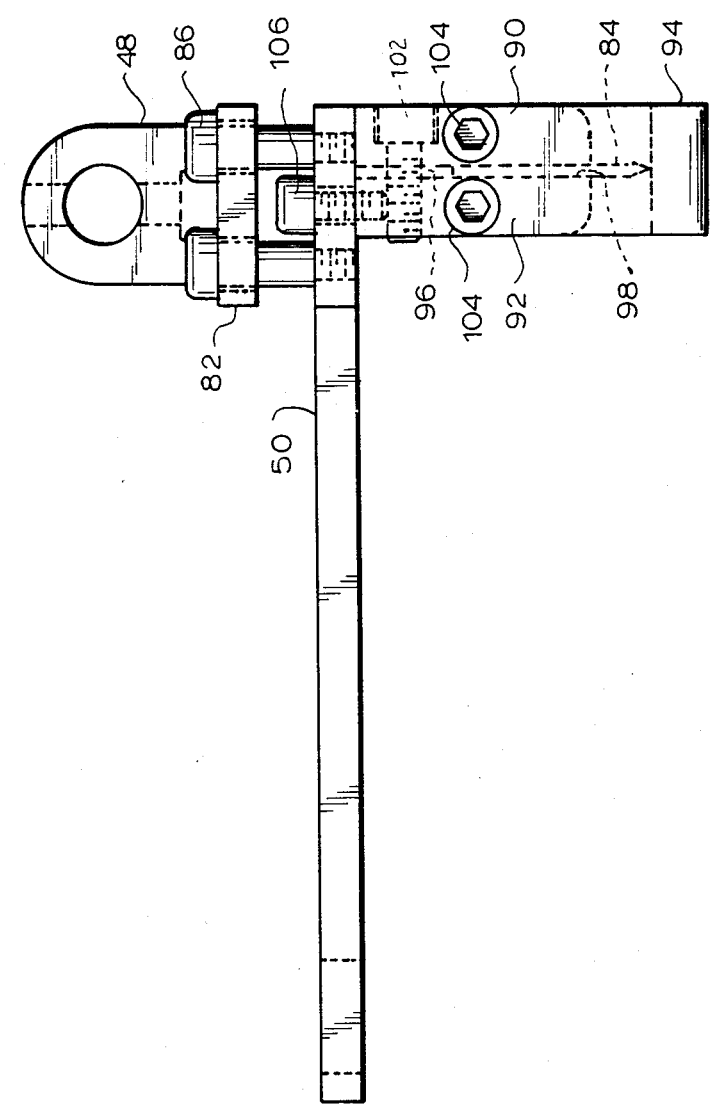

ULTRASONIC SEPARATION APPARATUS

BACKGROUND OF THE INVENTION

1. Field of the Invention

The field of the invention relates to an apparatus for ultrasonically cutting and sealing materials made from thermoplastic fibers.

2. Brief Description of the Prior Art

Ultrasonic cutting and sealing has been recognized as an effective means for avoiding frayed edges when cutting thermoplastic textile materials into desired shapes or sizes. U.S. Pat. No. 3,378,429 discloses an apparatus for performing this function. An ultrasonic horn is provided with a tool tip including a tapered cutting surface. As material is passed between the horn and anvil, it is compressed and sealed by the wider portion of the tapered surface and then cut by the narrower portion of this surface.

U.S. Pat. No. 3,679,526 employs a wire strip as a cutting surface. U.S. Pat. No. 3,852,144 uses a resiliently mounted cutting disk. An anvil including a knife edge portion is used in U.S. Pat. No. 4,161,420 for severing brassiere tapes. U.S. Pat. Nos. 4,025,374 and 4,227,959 relate to similar methods for cutting and sealing various materials.

Ultrasonic machinery has come into use in the bedding industry over the last several years. U.S. Pat. No. 4,234,983 concerns the manufacture of pocketed spring coils by ultrasonically welding a non-woven material after a coil spring has been inserted between plies thereof. The strings of pocketed coils may be assembled into a mattress innerspring construction in several different ways. In one method, one continuous string is maneuvered into a sinuous configuration so as to form a plurality of rows connected at the ends. Series of twines are used for connecting the rows so that they will remain in a substantially rectangular arrangement.

A square arrangement of pocketed coils within an innerspring assembly is disclosed in U.S. Pat. No. 4,234,984. A series of individual strips of coils are joined at alternative locations to arrive at this configuration. Since pocketed coil springs are generally manufactured in strings of considerable length, these strings must be cut to length wnen assembling an innersrping construction in such a manner. It is important that the springs within the end pockets remain there even after such cutting.

SUMMARY OF THE INVENTION

It is an object of the invention to provide an ultrasonic separation apparatus which seals and cuts in one operation.

It is another object of the invention to provide an apparatus which seals and cuts strings of pocketed coil springs to any selected length.

In accordance with these and other objects of the invention, which will be apparent upon review of the specification hereinafter and the drawings, an apparatus is provided which reliably separates strings of pocketed coils from a length thereof while insuring that the end pockets securely retain the springs therein.

The apparatus includes an electro-acoustical converter unit having a horn which is resonant at a preselected frequency. Anvil means including a cutting blade are mounted in opposing relation to the horn in the cutting position. Means are provided for moving the horn and cutting blade towards and away from each other. The cutting blade is operable when a thermoplastic strip is held in a stationary position between it and the ultrasonic horn. Simultaneous cutting and sealing is accomplished when sonic energy is applied to the horn.

The cutting blade is preferably mounted in a housing which allows it to oscillate back and forth as the cutting/sealing operation is performed. This allows it to cut a relatively thick material. The blade has an edge of selected sharpness to insure that cutting proceeds at a desired speed which will also provide proper sealing.

BRIEF DESCRIPTION OF THE DRAWINGS

FIG. 4 is an enlarged sectional front elevation view of a cutting blade and housing as employed in the apparatus; and FIG. 5 is a sectional side elevation view thereof.

DETAILED DESCRIPTION OF THE INVENTION

An apparatus 10 is provided for conveying, counting, cutting, and sealing strings 12 of pocketed coil springs 14. The cutting and sealing portion of the apparatus is applicable to other cutting and sealing operations as well.

Figure 1:
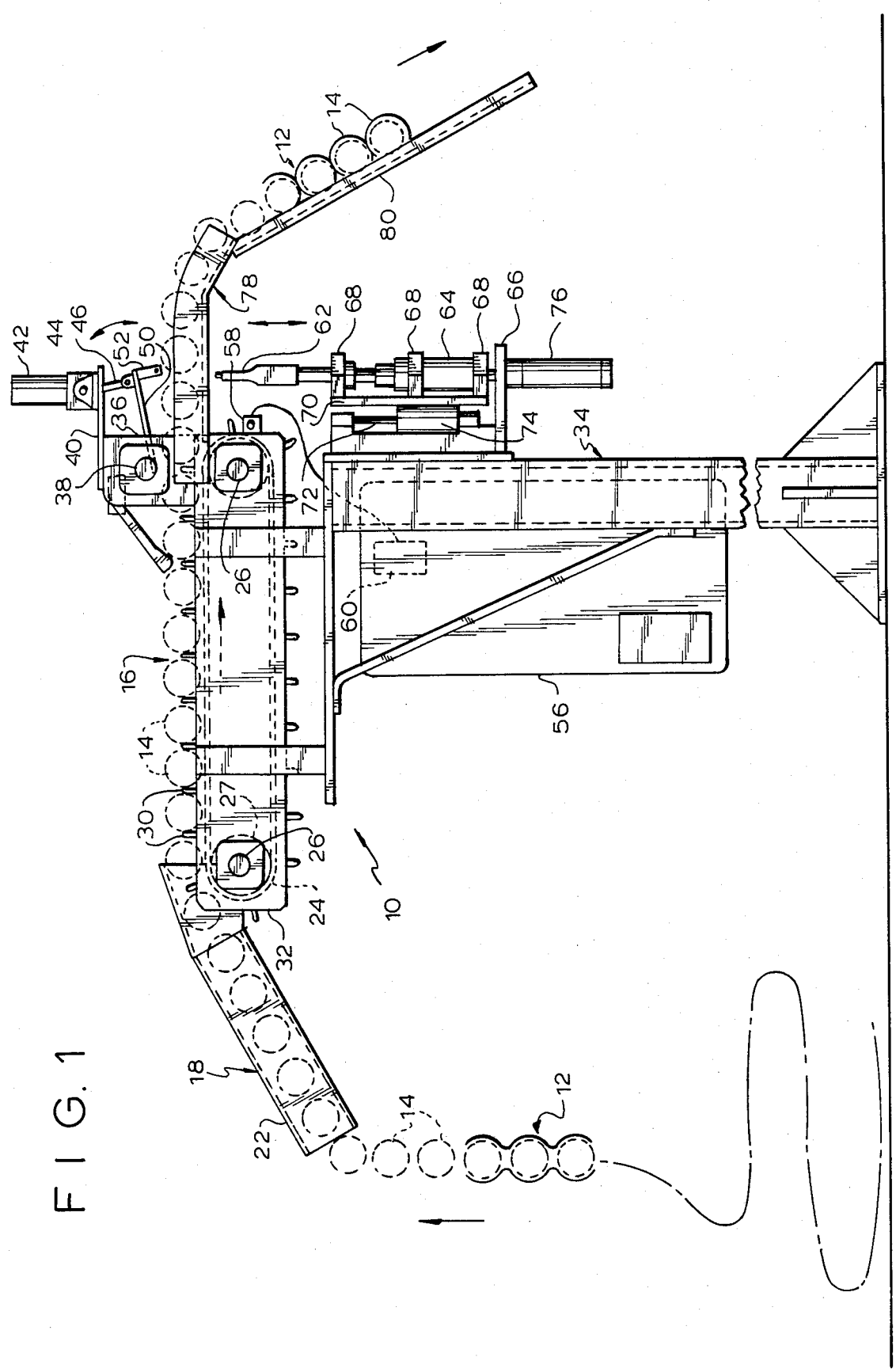
FIG. 1 is a side elevation view of an ultrasonic cutting and sealing apparatus in accordance with the invention.
Figure 2:
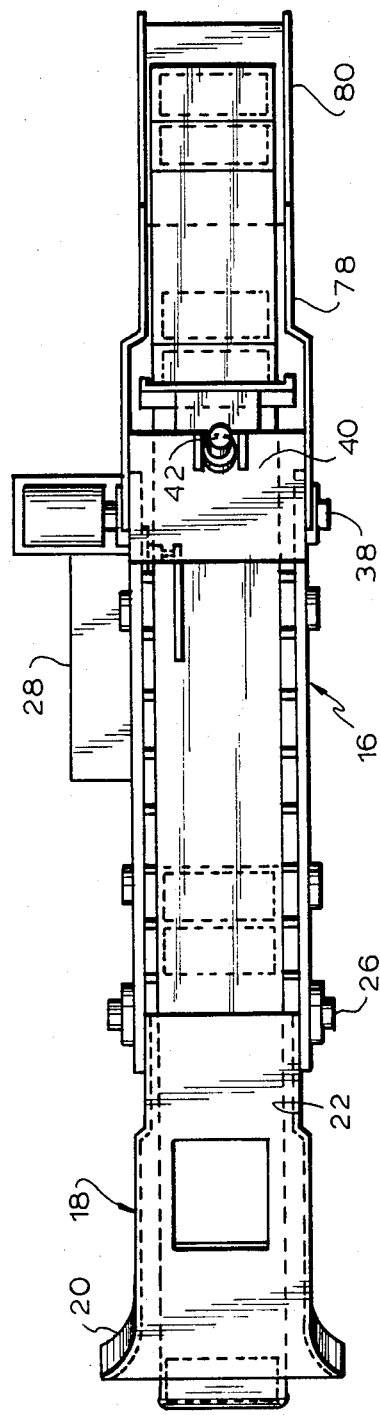
FIG. 2 is a top view thereof.

As shown in FIG. 1, a string of pocketed coils such as described in U.S. Pat. No. 4,234,983 is fed to a conveyor 16 through a chute 18. The chute 18 includes an opening defined by a set of diverging walls 20. The remainder of the chute defines a rectangular passage 22 leading to the conveyor 16. It has been found that this construction eliminates twisting of the string 12 and insures proper feeding. The passage 22 is only slightly larger than the dimensions of the pocketed coil springs.

The conveyor 16 includes an endless belt 24 mounted upon a pair of axles 26 and associated rolls 27. One of the axles is driven by a brake motor 28 which allows the belt 24 to be stopped instantaneously at a selected point. The belt 24 includes a plurality of radially extending ribs 30 which are spaced to accept one pocketed coil spring between successive pairs. Each axle 26 extends between a pair of plates 32 mounted to the framework 34 of the apparatus 10.

A pair of plates 36 are secured at the front end of plates 32. A pivot axle 38 together with the necessary bushings are mounted thereto. A top plate 40 is supported by plates 36 and has an air cylinder 42 mounted thereon by means of a bracket 44. The air cylinder 42 includes a piston 46 which is pivotably connected at pivot bracket 48 to arm 50. A cutting mechanism 52 is mounted to one end of the arm, the opposite end thereof being secured to pivot axle 38. Oscillatory movement of the piston 46 will accordingly cause the cutting mechanism 52 to move back and forth along an arc.

A spring detector 54 is pivotably mounted to plates 36. This device will ride up and down on the pocketed coil springs. Should a pocket be missing a spring, or if the spring is turned the wrong way therein, the detector will not swing up to the desired height. A control panel 56 mounted to the framework 34 monitors the operation of the apparatus. Should an irregularity be detected, the conveyor 16 and all other operational portions of the apparatus may be shut down.

A photodetector 58 mounted to one of the plates 32 detects the passage of the equally spaced conveyor ribs 30. The photodetector is connected to a counter 60 in the control panel. Since each rib corresponds to one pocketed coil, the device is actually counting the number of pocketed coils which have passed the cutting mechanism 52. When a preselected number of pocketed coil springs have been counted, the brake motor 28 is stopped and the cutting/sealing operation as hereinafter described is begun. The control panel monitors the operation of the air cylinder 42 and the movement of an ultrasonic horn 62.

The horn 62 is mounted to an ultrasonic transducer 64. Such transducers are well known and are commercially available from such sources as Dukane Corporation of St. Charles, Ill. The transducer 64 is mounted to a horizontally disposed plate 66 and is supported by brackets 68 secured to a vertical plate 70. A guide bar 72 connected to plate 70 by a bracket 74 insures the movement of the transducer will be entirely vertical. An air cylinder 76 controlled by panel 56 allows the horn 62 to move between its up and down positions.

A discharge chute 78 is mounted to plates 32 for guiding the pocketed coil springs from the conveyor belt 24 to a point between the cutting mechansim 52 and horn 62. The chute includes an opening in this area to allow the string 12 to be clamped therebetween prior to cutting and sealing. A guide board 80 is mounted to the chute.

The cutting mechansim 52 is shown in detail in FIGS. 4-5. It is mounted to a cushion plate 82 which in turn is welded to bracket 48. The end of arm 50 serves as a mounting plate for a plurality of retaining plates which house a cutting blade 84. Twelve shoulder bolts 86 extend between the cushion plate and the arm. Eight of them include compression springs 88 mounted thereto and between the two plates 50, 82. The springs cushion the impact of the cutting blade 84 when it is caused to contact a substrate between it and horn 62.

The blade 84 is held loosely in position by front and rear retaining plates 90, 92 and a pair of L-shaped end caps 94. A spacer plate 96 is provided between the retaining plates 90, 92 to define a slot 98 within which the upper portion of the blade is held. The ends of the cutting edge 100 of the blade rest against the inwardly extending portions of the end caps. Four cap screws 102 maintain the positions of the plates 90, 92, 96. Each end cap 94 is secured to this assembly by means of two cap screws 104. Three shoulder bolts 106 secure the arm 50 to the rear retaining plate 92.

As shown in FIG. 4, a clearance is provided between each end of the cutting blade 84 and the inner surface of the respective end cap 94. This allows it to oscillate in a side-to-side manner when in use. Due to the fact that pressure is applied to the blade by means of the compression springs 88, slight up and down movement is also permitted.

Figure 3:
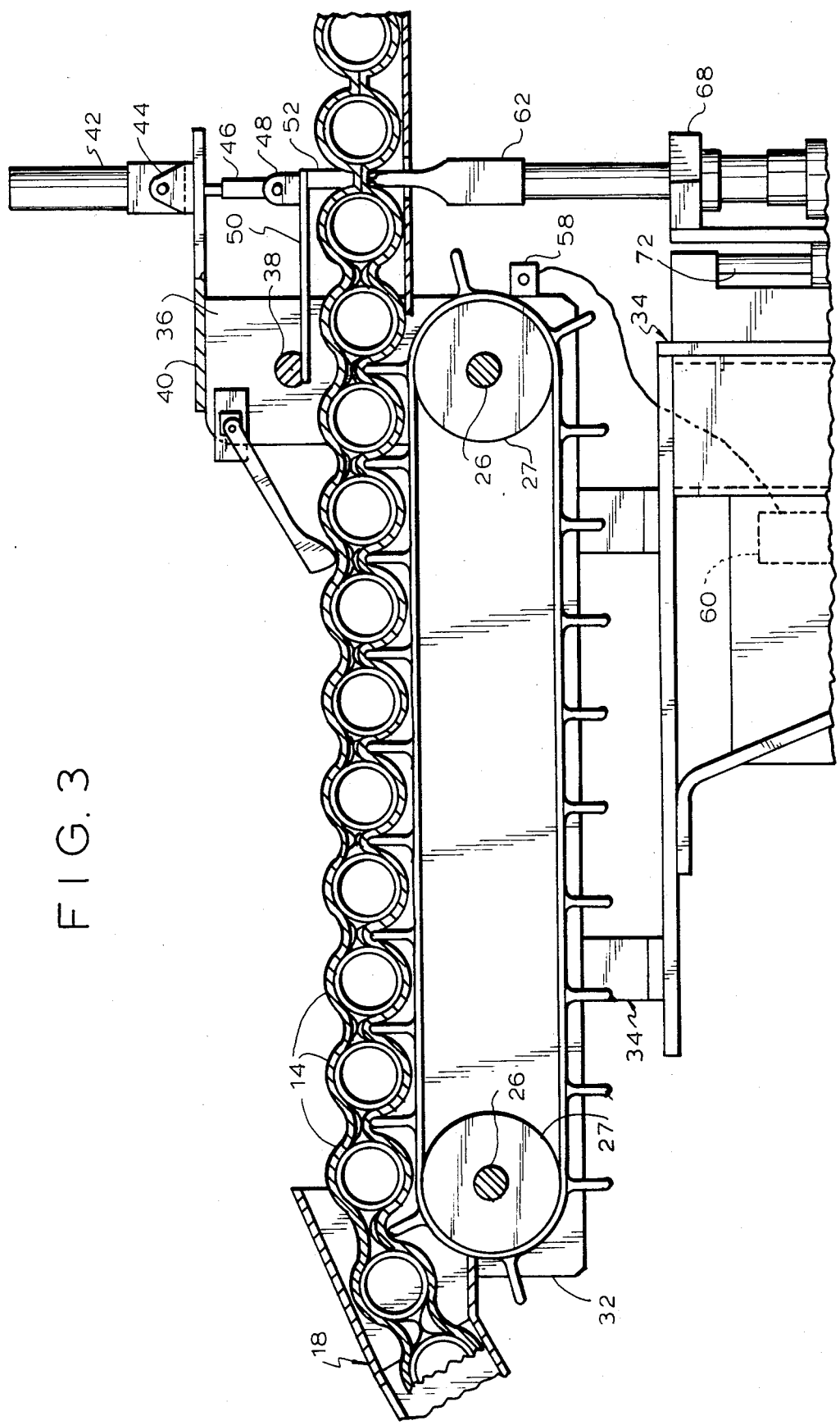
FIG. 3 is an enlarged side elevation view of a portion thereof.

In operation the apparatus 10 receives a string of pocketed coil springs such as described in U.S. Pat. No. 4,234,983. The pocketing material may be of DUON ®, a registered trademark of Phillips Petroleum Corporation, or other suitable material. The string is fed through the intake chute 18 and on to the conveyor 16. Each coil spring is positioned between a pair of ribs 30 on the conveyor belt 24. As the belt is driven by motor 28, the string proceeds through the discharge chute 78 and down the guide board 80. The photodetector detects the passage of each rib 30 thereby. When a preselected number is reached, the conveyor 16 is stopped. Air cylinders 42 and 76 are actuated nearly simultaneously and cause the cutting mechansim 52 and ultrasonic horn 62 to move into position. The horn extends through the opening in the discharge chute 78 and contacts the lower surface of the pocket material between a pair of springs. The cutting blade 84 is resiliently urged into contact with the upper surface of this material as shown in FIG. 3. The transducer 64 is actuated and the pocket material is welded at the same time as it is severed. A string of selected length is accordingly produced without damaging the end pocket. Once this operation is completed, the cutting mechanism 52 and horn 62 are moved back to their inoperative positions as shown in FIG. 1. The cycle may then begin again.

While the apparatus 10 shown herein is particularly applicable to the cutting of strings of pocketed coil springs, the cutting mechanism 52 thereof could be applied to other uses. As employed herein, the mechanism has successfully cut and sealed two thicknesses of pocketing material. It could be employed wherever a cutting operation needs to be combined with the production of a sealed edge. The sharpness of the blade may be adjusted to allow sufficient time for sealing to occur as the substrate material is cut. Specific parameters are dependent upon the materials employed.

What is claimed is:

1. An ultrasonic cutting and sealing apparatus comprising:
    an ultrasonic horn;
    means coupled to said horn for causing the resonant vibration thereof;
    a cutting mechanism, said cutting mechanism including a housing and an elongate cutting blade mounted to said housing, a space being defined between at least one end of said cutting blade and said housig to allow said cutting blade to oscillate along its longitudinal axis; and
    means for moving said ultrasonic horn and said cutting mechanism toward each other.

2. An apparatus as defined in claim 1 including means for resiliently mounting said cutting mechanism.

3. An apparatus as defined in claim 1 wherein said housing includes front and rear walls defining a slot therebetween, said cutting blade being partially positioned within said slot, and a pair of end walls, said space being defined between an end of said cutting blade and one of said end walls.

4. An apparatus as defined in claim 3 wherein said cutting blade includes a cutting edge extending from said slot, said housing including a pair of supporting surfaces supporting the opposing ends of said cutting edge to hold said cutting blade within said slot.

5. An apparatus as defined in claim 1 including a mounting plate, a cushioning plate resiliently supported by said mounting plate, front and rear retaining plates mounted to said cushioning plate and defining a slot therebetween, said cutting blade partially positioned within said slot, a pair of end walls mounted to said front and rear retaining plates for limiting movement of said cutting blade along its longitudinal axis, and means retaining said cutting blade within said slot.

6. An apparatus as defined in claim 5 wherein said retaining means are a pair of L-shaped end caps mounted to said front and rear retaining plates.

7. An apparatus as defined in claim 6 including a spacer plate between said front and rear retaining plates.

8. A method for ultrasonically cutting and sealing a material, comprising:
   providing a cutting mechanism including an elongate cutting blade mounted thereto, said cutting blade being movable for a limited distance along its longitudinal axis;
   providing an ultrasonic horn;
   positioning said material between said cutting blade and ultrasonic horn and in contact therewith; and
   causing said ultrasonic horn to resonate at a desired frequency, thereby causing said cutting blade to oscillate along its longitudinal axis and cut and seal said material.

9. A method as described in claim 8 including the step of resiliently urging said cutting mechanism against said material and said ultrasonic horn.

10. A method as described in claim 8 wherein said material is pocket material encasing a coil spring.

* * * * *